March 3, 1959 H. C. LIKEL 2,876,341

FAULT ALARM RADIO REPEATER SYSTEM

Filed June 11, 1953 4 Sheets-Sheet 1

INVENTOR.
H. C. LIKEL

BY

Edward R. Hyde Jr.

ATTORNEY

INVENTOR.
H. C. LIKEL
BY
Edward R. Hyde Jr.
ATTORNEY

March 3, 1959 H. C. LIKEL 2,876,341

FAULT ALARM RADIO REPEATER SYSTEM

Filed June 11, 1953 4 Sheets-Sheet 3

INVENTOR.
H. C. LIKEL

BY Edward R. Hyde Jr.

ATTORNEY

INVENTOR.
H. C. LIKEL
BY *Edward R. Hyde Jr.*
ATTORNEY

United States Patent Office 2,876,341
Patented Mar. 3, 1959

2,876,341
FAULT ALARM RADIO REPEATER SYSTEM

Harry C. Likel, Brooklyn, N. Y., assignor to The Western Union Telegraph Company, New York, N. Y., a corporation of New York Application June 11, 1953, Serial No. 360,859
7 Claims. (Cl. 250—15)

This invention relates to fault alarm systems for microwave radio repeaters.

A typical radio system comprises two terminal stations and a plurality of repeaters located at fixed distances between the terminals. Equipment malfunctions, the occurrence of fading and other troubles at the repeaters may cause interruption of transmission. Since the repeater stations are customarily unattended, it is important that the terminal stations receive information concerning a faulted repeater in order that action can be taken to clear the fault and restore service between the terminal stations.

It is, therefore, an object of this invention to provide means whereby a terminal station is informed of low input to any repeater in the system.

It is a further object of this invention to provide means whereby a terminal station will be informed of low output level of a repeater.

A further object of this invention is to provide means whereby local conditions at the repeater such as entry into the building, low temperature and other information is communicated to the terminal stations.

A still further object of this invention is to provide means at a repeater to reestablish the carrier in the event of failure of service.

These and other objects will become apparent from the following description of the invention taken in conjunction with the accompanying drawings in which—

Figure 1:
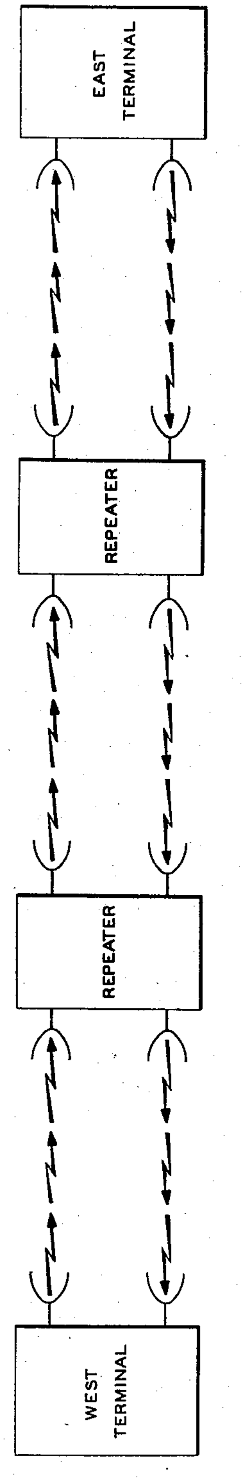
Fig. 1 is a schematic representation of a radio relay system showing two terminal stations and two repeaters.

The system disclosed in Fig. 1 represents a typical radio relay system for two-way transmission of radio signals between two terminal stations. Intermediate the terminal stations are a plurality of repeaters whose purpose is to relay received signals from a preceding repeater or terminal station to the next repeater or terminal station. The repeater stations may be of any number although two are shown in Fig. 1.

Figures 2, 6:
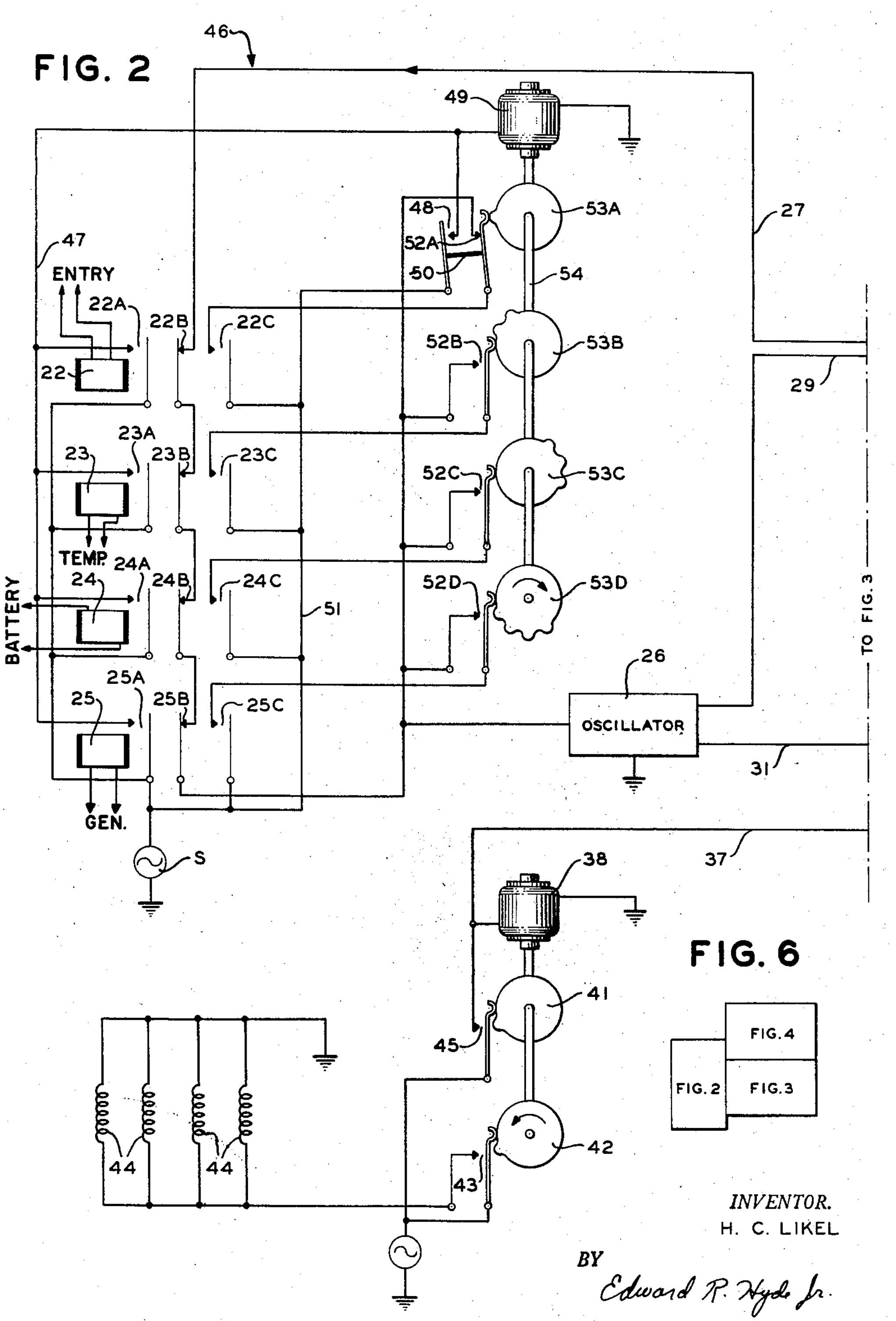
Figs. 2, 3 and 4 illustrate diagrammatically the receiving and transmitting apparatus at a repeater station along with the circuit connections of the fault alarm system.
Fig. 6 shows the method of arranging Figs. 2, 3 and 4.
Figure 3:
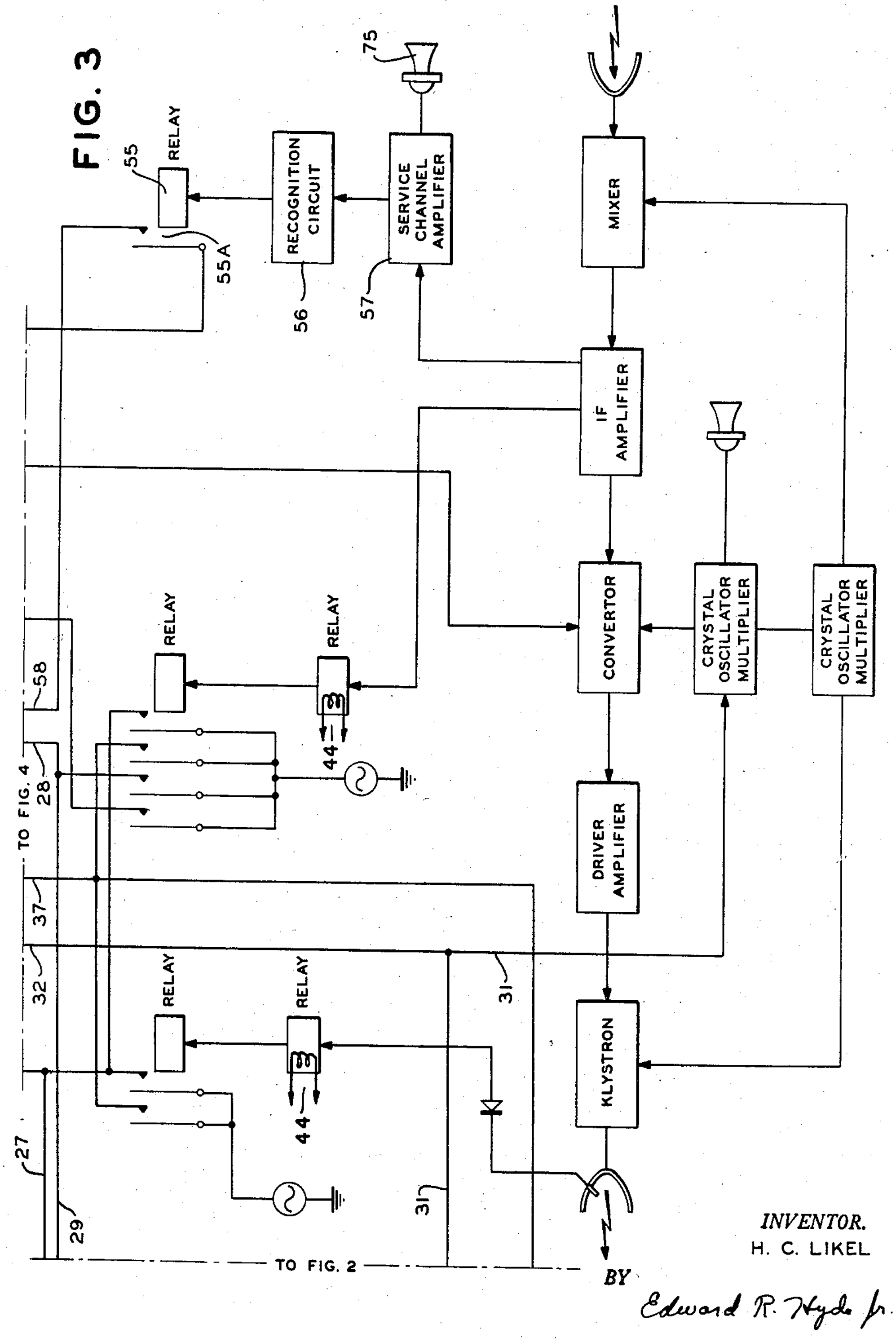
Figure 4:
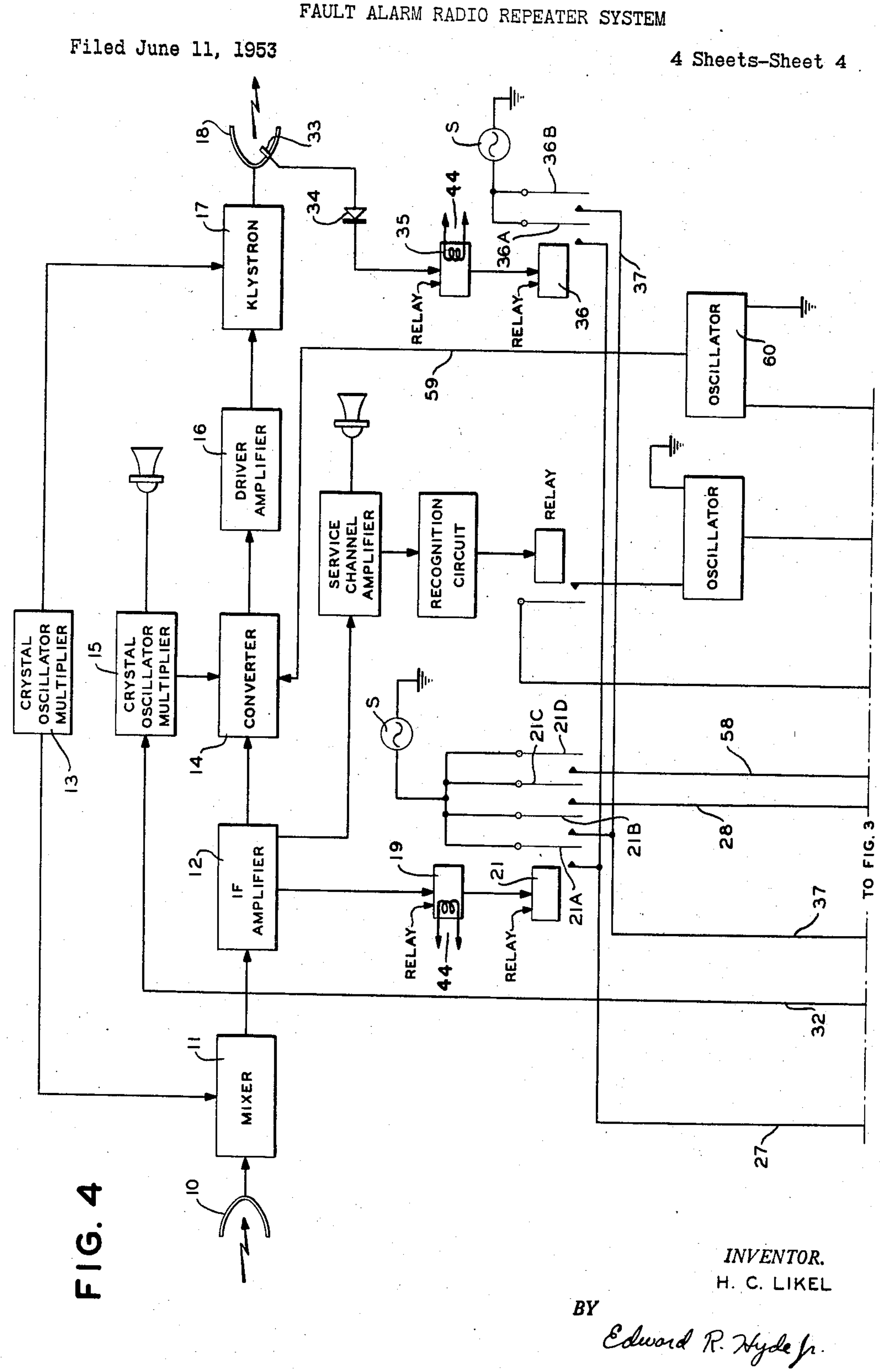

The repeater shown in Figs. 2, 3 and 4 is representative of any one of a series of such repeaters linking two terminal stations. For purposes of description the left side of Figs. 3 and 4 will be considered west and the right side east. Each repeater is designed to relay both west to east and east to west signals through the employment of two similar sets of equipment facing in opposite directions. Considering the west to east repeating equipment, there is provided a receiving antenna 10 which applies the incoming wave, which may for example have a carrier frequency of 4040 mc., to a mixer 11 to which is also supplied a 3970 mc. signal from a local crystal controlled oscillator and frequency multiplier 13. The mixer 11 produces a 70 mc. intermediate frequency which is fed to a 70 mc. intermediate frequency amplifier 12 provided with automatic gain control. The output of this amplifier is applied to a converter 14 and mixed with a 180 mc. output from another local oscillator 15. Here again, the signal wave is translated complete with all modulation, to 110 mc. by the selection of the difference frequency components. This wave is amplified by amplifier 16 and applied along with some of the output of oscillator 13 to a klystron power amplifying tube 17 which feeds transmitting antenna 18 with a carrier having a frequency of 4080 mc., i. e., the 3970 mc. of the local oscillator 13 plus the 110 mc. signal.

It is seen from the above description that the carrier transmitted by the repeater is the same carrier that is received thereby, though at a different frequency due to the frequency translation function effected in the repeater. Therefore, unlike prior art repeaters, there is no demodulating of the input carrier with subsequent modulating of a new output carrier. Hence the necessity for a frequency source of the fundamental carrier frequency output at the repeater is eliminated.

The elements that make up the receiving and transmitting apparatus of the repeater may be of any convenient design, and are here represented in block form since the details of these elements form no part of the present invention. In fact, other transmitting and receiving arrangements could be equally well employed with the fault alarm system hereinafter described. It is of course understood that the frequencies set forth here are by way of example only, and any other convenient frequencies may be employed.

It may be readily understood, that due to a malfunction of a preceding repeater, or other cause, the input signal might be weak beyond the ability of the repeater to restore it to its normal value, or it might be absent completely. This condition must be made known to the operators at the terminal stations so that remedial steps may be taken. Accordingly, a sensitive relay 19 is coupled to the automatic gain control circuit of the intermediate frequency amplifier 12. A "Sensitrol Relay," of the type shown in U. S. Patent No. 2,062,915 has been used for this purpose and has been found to be very satisfactory because of its sensitivity and simplicity. The contacts of this relay are set to be held open by a predetermined value of current in the automatic gain control circuit of the intermediate frequency amplifier 12. If the current falls below this minimum value for which the relay is set, the contacts will close and lock by virtue of the action of a small permanent magnet associated with them. Sensitrol relay 19 is arranged to control a relay 21 so that upon closing of the contacts of the Sensitrol relay, relay 21 is energized to close its four normally open contacts 21A, 21B, 21C, and 21D. Contacts 21A complete a circuit from a locally available 110 volt 60 cycle source S over line 27 through normally closed relay contacts 22B, 23B, 24B and 25B to a fault tone audio oscillator 26. Contacts 21C, also connected to the source S, supply a modulating signal, over wires 28 and 29, for the output of audio oscillator 26. Its modulated output is applied to both the eastward and westward transmitters over wires 31 and 32 which connect to local oscillator 15 to vary its frequency and consequently modulate the frequency of the carrier, thereby indicating to the terminal station operators a low input to the repeater. The fault tone oscillator at each repeater will have a distinctive tone so that the terminal operators can readily determine which repeater has faulted.

A crystal mount 33 is provided on a directional coupler in the transmitting wave guide 18 to pickup and rectify a small amount of the transmitted power. This is conducted to another Sensitrol relay 35 with normally open contacts arranged to close when the transmitted power falls below a predetermined minimum for which the Sensitrol relay is set. Closure of these contacts serve to energize relay 36 thereby closing normally open contacts 36A and 36B. Contacts 36A complete a circuit from the 60 cycle 110 volt source to the fault tone oscillator 26 over line 27 previously traced in regard to the low input detecting relay 21.

It is seen, therefore, that in both a low input level and low output level condition, the fault tone oscillator 26 is energized to frequency modulate the carrier thereby indicating the faulted condition. However, only in the case of a low input level received by the repeater is the fault tone oscillator amplitude modulated by a 60 cycle modulating frequency (over wires 28 and 29). By this means a low input level condition is distinguished from a low output condition.

As mentioned above, the Sensitrol relay contacts are brought together and held with the necessary pressure for good contact by the action of a small permanent magnet. The strength of this magnet is such that should the fade in signal pass and come back to normal, it would nevertheless not exert a force in the Sensitrol relay great enough to release the contacts. To overcome this, solenoid release mechanisms are provided which when pulsed force the contacts apart. Contacts 21B and 36B of power relays 21 and 36 are connected in parallel so that the closing of either, due to low input signal and low output signal respectively, will complete a circuit from a source of 110 volt 60 cycle power over wire 37 to energize timer motor 38 of a release unit. The timer is a commercially available type set to rotate at ¼ R. P. M. Secured to the timer shaft is a cam 42 arranged to close normally open contacts 43 to energize release solenoids 44 each of which is associated with a Sensitrol relay. The energization of a solenoid 44 will release the closed contacts of the Sensitrol relay associated therewith.

It is seen, therefore, that upon detection of a low input signal or low output signal, timer 38 is caused to energize to rotate cam 42. After an interval of four minutes cam actuated contacts 43 close to energize solenoids 44 thereby releasing any Sensitrol relay that is closed. When the Sensitrol contacts are opened, they will remain so if the faulted condition is cleared and current is back to the minimum for which they were set. If the fault is not cleared, the contacts will immediately reclose and the cycle will be repeated. The time interval of four minutes was chosen as a compromise between the desire to stop the signal as soon as possible and the need to keep the wear and tear on the Sensitrol relays down when an equipment difficulty causes this action to repeat for a considerable period of time.

A second cam 41 is secured on the timer shaft to close normally open contacts 45. This cam is positioned so that when cam 42 energizes solenoids 44 thereby releasing the Sensitrol relays, the motor circuit is not broken for several additional seconds. Otherwise the motor circuit would break upon the closing of contacts 43 which would therefore remain closed, constantly energizing release solenoids 44 thereby rendering the Sensitrol relays unresponsive to a faulted condition.

The fault tone keying unit 46 includes four relays 22, 23, 24 and 25 operated by circuits (not shown) responsive to various local conditions. For example, relay 22 is energized upon unlawful entry into the apparatus building, relay 23 by low temperature, relay 24 by operation of the equipment from batteries because of failure of the commercial power supply and relay 25 by operation of the equipment from a generator for the same reason. Relays 22 to 25 each have a set of paralleled make contacts 22A to 25A. If any one of these closes, a circuit is completed from a 110 volt 60 cycle source S over wire 47 to energize a one R. P. M. motor 49. Energization of any one of relays 22 to 25 also closes one of a set of contacts 22C to 25C respectively to close a circuit from the 110 volt 60 cycle source S over wire 51 and the respective one of cam controlled switches 52A to 52D to fault tone oscillator 26. Switches 52A to 52D are controlled by cams 53A to 53D respectively, secured to shaft 54 of motor 49. As shown, each of these cams will close its associated switch 52A to 52D a predetermined number of times for one rotation of shaft 54. Cam 53A will close switch 52A once, cam 53B will close switch 52B twice, etc., thereby keying the oscillator 26 in accordance with the particular relay 22 to 25 which is energized. The fault tone oscillator output is therefore coded and connects with the repeater transmitters over wires 31 and 32 to frequency modulate the carrier thereby informing the terminal operators of the local faulted condition. It should be noted that the groups of projections on cams 53A to 53D are spaced in time so that the signals are easily distinguishable as a group and no confusion will arise due to overlapping of signals should more than one local fault relay 22 to 25 become energized at the same time. Motor control switch 48 is mechanically linked by insulating bar 50 to cam controlled switch 52A so that motor 49 is controlled by cam 53A whereby after each revolution the motor may be stopped leaving cams 53A to 53D in the original position if the local fault has cleared at that time. This prevents the motor from stopping in the middle of a signal sequence and causing confusion should the faulted condition clear at such a time.

The various fault detection circuits so far described may be summarized as follows:

(1) Low transmitter output at a particular repeater causes relay 36 to close thereby energizing fault tone oscillator 26. The latter will produce a constant tone to frequency modulate the main carriers.

(2) Low input signal closes relay 21 to energize the fault tone oscillator 26 and also modulate the output therefrom with a 60 cycle source (over wire 29). The modulated output from the oscillator in turn modulates the main carriers.

(3) Various local conditions such as entry into the apparatus building, low temperature, etc., cause the fault tone oscillator to be energized by coded pulses thereby modulating the main carrier in accordance with the coded pulses.

Considering now a radio relay system comprising 10 repeaters between a west terminal and an east terminal numbered from west to east, and the west to east circuit fails at repeater No. 3, there will be no west to east carrier at repeaters 4, 5, 6, 7, 8, 9 or 10. Thus, these stations can not send any information to the east terminal, but since the system herein disclosed sends notice of a fault in both directions, the west terminal will be informed that stations 3 to 10 are not operating eastbound and therefore there is trouble eastbound at station No. 3. If, however, an additional failure develops anywhere in the westbound circuit this information can not be made known to the terminal operators because neither carrier is received at the terminal stations. To avoid this type of situation which would leave the terminal personnel completely in the dark as to where the faults existed, it is necessary to provide some means of reestablishing the carrier in the unfaulted part of the system.

There is therefore provided a carrier reestablishment oscillator 60 of conventional construction and set to oscillate at the intermediate frequency which in the example herein shown is 70 mc. The output of oscillator 60 is applied to the transmitter output over wire 59 thereby reestablishing the carrier so that any fault signal applied to the system will be transmitted to the terminal station. The oscillator 60 is energized from a local source of power over a circuit including contacts 21D of relay 21, line 58 and contacts 55A of relay 55. As set forth above, relay 21 is energized upon a low input signal received by the repeater. Energization of this relay closes contacts 21D to partially complete the energizing circuit for oscillator 60. However, the reestablishment oscillator is not energized at this time because contacts 55A are in their normally open position. Relay 55 is controlled by a recognition circuit 56 which is responsive only to a predetermined signal, for example, a 20 kc. signal frequency modulated at 60 cycles as derived from a service channel amplifier 57 at each repeater as a result of the reception of a 20 kc. FM signal sent out at the terminal station. This signal is sent out only when it is desired to start the carrier reestablishment oscillator. As shown in Fig. 4, a failure of the eastward carrier will result in the closing of contacts 21D. The operator at the east terminal, who of course knows that the eastward carrier has failed, applies a 20 kc. FM signal to the westward carrier which is received by the westward receiver, amplified by audio amplifier 57 and applied to control circuit 56 to energize relay 55. The energizing circuit for the reestablishment oscillator 60 is therefore completed over the circuit from oscillator 60, closed contacts 55A of relay 55, wire 58, and contacts 21D to source S. The 70 mc. output of the oscillator is applied to the eastward transmitter over wire 59 thereby reestablishing the carrier. The reestablishment oscillator remains energized only so long as the 20 kc. FM signal from the east terminal is transmitted and received at the repeater to maintain relay 55 energized.

Considering again the example of a failure of the eastward carrier at repeater No. 3, the reestablishment oscillator at each of stations 3 to 10 will be conditioned due to the failure of an input signal in the eastward direction. The east terminal operator will transmit a 20 kc. recognition signal which will initially energize all of the conditioned reestablishment oscillators. However, as stations No. 4 to No. 10 receive the reestablished carrier from each preceding station, their respective reestablishment oscillators will deenergize, due to the release of relays 21 at each station, leaving only the oscillator at faulted station No. 3 energized to reestablish the carrier. It is of course unnecessary that the reestablishment oscillators at the unfaulted stations 4 to 10 remain energized.

Figure 5:
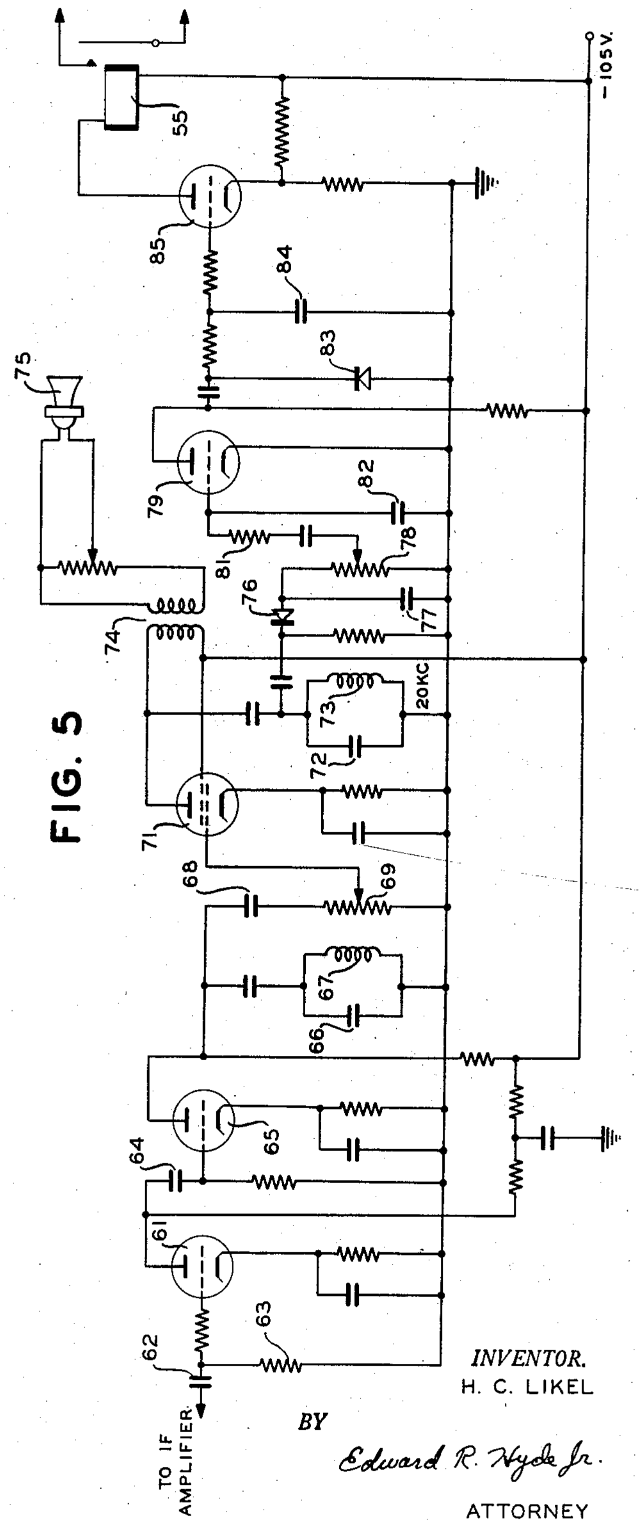
Fig. 5 is a circuit diagram of a service channel amplifier and control circuit for carrier reestablishment apparatus.

Referring now to Fig. 5, there is shown a circuit diagram of the service channel amplifier 57 and control circuit 56.

The amplifier input signals, derived from the 70 mc. I. F amplifier's discriminator, are applied to tube 61 through a blocking condenser 62. A load resistor 63 constitutes the input impedance of the amplifier. The output of tube 61 is capacity coupled by condenser 64 to the control grid of tube 65. A parallel resonant circuit comprising condenser 66 and inductance 67 tuned to a frequency of 20 kc. is provided in the plate circuit of tube 65. Across the parallel resonant circuit is a condenser 68 and a variable resistor 69 the center tap of which connects to the control grid of a third amplifying tube 71. A second parallel resonant circuit comprising condenser 72 and inductance 73, tuned to a frequency of 20 kc. is connected in the plate circuit of tube 71. The response characteristic of the amplifier therefore has a peak in the neighborhood of 20 kc. in addition to voice frequency response. Connected between the plate and screen grid of tube 71 is a transformer 74, the secondary winding of which is coupled to a loudspeaker 75 whereby a terminal operator can communicate with a maintainer at the repeater.

The amplifier is designed to handle frequencies in the ordinary speech range. Speech signals will therefore be delivered to the loudspeaker 75, while the 20 kc. signals which are frequency modulated at a 60 cycle rate to actuate the recognition circuit sweep back and forth across the response peak of the amplifier and become amplitude modulated at 120 cycles. This output is delivered to a crystal demodulator circuit comprising rectifier 76, capacitor 77 and resistor 78. The rectified output of the demodulator is fed to the control grid of amplifier tube 79 by means of resistor 81 and capacitor 82. A second crystal restifier 83 is connected to the output of amplifier tube 79 whereby the signals are rectified, filtered by condenser 84 and applied to the grid of tube 85 in whose plate circuit relay 55 is connected. In the absence of the 20 kc. recognition signals, the plate current of tube 85 is insufficient to close relay 55. However, upon receipt of the recognition signal, the plate current of this tube will increase to energize relay 55 thereby energizing the carrier reestablishment oscillator 58 as previously set forth.

The above-described circuit provides various safeguards against inadvertent operation of the recognition circuit by spurious signals. The response characteristic of the amplifier 57 is shaped to drop off rapidly above 3 kc. and have a high sharp peak near 20 kc. due to the parallel resonant circuit of condenser 72 and inductance 73, thereby providing a high degree of selectivity for 20 kc. signals. Also, to eliminate any possibility of a strong low frequency signal on the service channel getting to the grid of tube 79, the low frequency response of the amplifier is purposely made poor. As a further protection against spurious signals operating the circuit, the time constant of the rectifier and filter circuits are made such that a signal that swept through 20 kc. would not cause operation of the relay 55 unless its recurrent rate was in the 120 cycle range and persisted for at least one second.

It is seen from the above, that the carrier reestablishment oscillator is not put into operation automatically by the detection of low input or even by failure of an input signal. This condition merely prepares the oscillator energization circuit, which is completed only upon receipt of a recognition signal from a terminal station. The purpose of not having the reestablishment oscillator under the exclusive control of the low signal detection relays, is to prevent the oscillator from going into effect and knocking out the main carrier which may be so weak as to energize the low signal Sensitrol detecting relays but nevertheless sufficiently strong to maintain communication. The Sensitrol relays are set to detect such a carrier since this condition must be made known to the terminal operators while at the same time carrier reestablishment is not necessary. As propagation and other conditions vary from day to day, only at the terminal is it possible to tell when the system has actually failed. Hence, there is provided the dual mutually dependent control of the carrier reestablishment oscillator energization circuit.

It should be noted that the above description of the repeater apparatus was based upon west to east transmission. Duplicate apparatus is provided at each repeater (as disclosed in Fig. 1) for east to west transmission.

It is, of course, understood that the specific embodiment of the invention herein disclosed is by way of example only and various modifications and changes may be made without departing from the scope or spirit of the invention as defined in the appended claims.

What is claimed is:

1. In a radio relay system having a repeater station and two terminal stations, apparatus at said repeater station including a receiver and a transmitter, fault detecting means connected to said receiver, carrier reestablishment generating means having an energizing circuit and an output circuit, said output circuit being coupled to said transmitter, two normally open switches in said energizing circuit, means under control of said fault detecting means to close one of said normally open switches, and means responsive to a signal from a terminal station to close the other of said normally open switches to complete the energization circuit of said carrier reestablishment means.

2. In a radio relay system having two terminal stations and at least one repeater station, apparatus at the repeater station including a receiver and transmitter, fault detecting means connected to said receiver responsive to received signals below a predetermined power level, a carrier reestablishment oscillator with an energizing circuit and an output circuti, means coupling the output circuit to said transmitter, means responsive to said fault detecting means to prepare said energizing circuit, and means responsive to a signal from a terminal station to complete said energizing circuit.

3. In a radio relay system having two terminal stations and at least one repeater station, apparatus at said repeater station including a receiver and a transmitter, fault detecting means coupled to said receiver and set to respond upon received signals falling below a predetermined power level, a fault tone oscillator, means responsive to said fault detecting means to energize said fault tone oscillator, means coupling the output of said fault tone oscillator to the transmitter to modulate the carrier signal thereby indicating a faulted condition, a carrier reestablishment means wtih an energizing circuit and an output circuit, means coupling the output circuit of the carrier reestablishment means to the transmitter, other means responsive to said fault detecting means to prepare said energizing circuit, and means responsive to a signal from a terminal station to complete the energizing circuit thereby reestablishing a faulted carrier to permit the fault tone oscillator to signal the location of a faulted condition to a terminal station.

4. In a radio relay system having two terminal stations and a plurality of repeater stations, apparatus at each repeater station including a receiver and a transmitter, fault detecting means coupled to said receiver and set to respond when the main carrier signal is not received, a fault tone oscillator, the fault tone oscillator at each repeater being designed to oscillate at a different characteristic frequency, means responsive to said fault detecting means to energize said fault tone oscillator, means coupling the output of said oscillator to the transmitter, a carrier reestablishment means with an energizing circuit and an output circuit, means coupling the output circuit of the carrier reestablishment means to the transmitter, other means responsive to said fault detecting means to prepare said energizing circuit, and means responsive to a signal from a terminal station to complete the energizing circuit thereby reestablishing a faulted carrier to permit the fault zone oscillator to signal the location of a faulted condition to a terminal station.

5. In a radio relay system including two terminal stations and an intermediate repeater station, apparatus at said repeater station comprising a first receiver and transmitter for relaying radio signals in one direction, a second receiver and transmitter for relaying radio signals in another direction, fault detecting means coupled to said first receiver and to said second receiver, fault tone means, means responsive to said fault detecting means to energize said fault tone means, means coupling the output of said fault tone means to said first and second transmitters, a first carrier reestablishment oscillator with an energizing circuit and an output circuit, means coupling said output circuit to said first transmitter, a second carrier reestablishment oscillator with an energizing circuit and an output circuit, means coupling the output circuit of the second carrier reestablishment oscillator to said second transmitter, other means responsive to said fault detecting means to condition each of said energizing circuits, means responsive to a signal from one terminal station to complete the energizing circuit of the first carrier reestablishment oscillator and means responsive to a signal from the other terminal station to complete the energizing circuit of the second carrier reestablishment oscillator.

6. In a radio relay system including two terminal stations and an intermediate repeater station, apparatus at said repeater station comprising a first receiver and a first transmitter for relaying radio signals in one direction, a second receiver and a second transmitter for relaying radio signals in another direction, a first fault detecting means coupled to said first receiver, second fault detecting means coupled to said second receiver, a fault tone oscillator, means responsive to said first fault detecting means to energize said oscillator, means responsive to said second fault detecting means to energize said oscillator, means coupling the output of the fault tone oscillator to said first transmitter and to said second transmitter, a first carrier reestablishment oscillator with an energizing circuit and an output circuit, means coupling the output circuit of the first carrier reestablishment oscillator to the first transmitter, a second carrier reestablishment oscillator with an energizing circuit and an output circuit, means coupling the output circuit of the second carrier reestablishment oscillator to the second transmitter, other means responsive to said first fault detecting means to condition the energizing circuit of the first carrier reestablishment oscillator, other means responsive to said second fault detecting means to condition the energizing circuit of the second carrier reestablishment oscillator, means responsive to a signal from one terminal station to complete the energizing circuit of the first carrier reestablishment oscillator and means responsive to a signal from the other terminal station to complete the energizing circuit of said second carrier reestablishment oscillator.

7. In a radio relay system including two terminal stations and a plurality of intermediate repeaters, each repeater comprising a first receiver and a first transmitter for relaying radio signals in one direction, a second receiver and a second transmitter for relaying radio signals in another direction, first fault detecting means connected to said first receiver, second fault detecting means connected to said second receiver, each of said first and second fault detecting means set to respond when a main carrier signal is not received by the first and second receivers respectively, a fault tone oscillator, the fault tone oscillator at each repeater being designed to oscillate at a different characteristic frequency, means responsive to said first fault detecting means to energize said oscillator, means responsive to said second fault detecting means to energize said oscillator, means coupling the output of the fault tone oscillator to said first transmitter and to said second transmitter, a first carrier reestablishment oscillator with an energizing circuit and an output circuit, means connecting the output circuit of the first carrier reestablishment oscillator to the first transmitter, a second carrier reestablishment oscillator with an energizing circuit and an output circuit, means connecting the output circuit of the second carrier reestablishment oscillator to the second transmitter, other means responsive to said first fault detecting means to condition the energizing circuit of the first carrier reestablishment oscillator, other means responsive to said second fault detecting means to condition the energizing circuit of the second carrier reestablishment oscillator, means responsive to a signal from one terminal station to complete the energizing circuit of the first carrier reestablishment oscillator thereby reestablishing a faulted carrier in one direction to permit the fault tone oscillator to signal the location of a faulted condition, and means responsive to a signal from the other terminal station to complete the energization circuit of the second carrier reestablishment oscillator thereby reestablishing a faulted carrier in the other direction to permit the fault tone oscillator to signal the location of a faulted condition.

References Cited in the file of this patent

UNITED STATES PATENTS

| | | |
|---|---|---|
| 2,257,094 | Goldstine | Sept. 30, 1941 |
| 2,287,044 | Kroger | June 23, 1942 |
| 2,296,384 | Hansell | Sept. 22, 1942 |
| 2,344,813 | Goldstine | Mar. 21, 1944 |
| 2,460,789 | Thompson | Feb. 1, 1949 |
| 2,514,367 | Bond et al. | July 11, 1950 |
| 2,524,861 | Wallace et al. | Oct. 10, 1950 |
| 2,691,065 | Thompson | Oct. 5, 1954 |
| 2,699,495 | Magnuski et al. | Jan. 11, 1955 |
| 2,706,286 | Wheeler et al. | Apr. 12, 1955 |